3,763,190
PREPARATION OF PURE GLYCOLIDE
Donald L. Ross, Palo Alto, Hugh C. Barrett, Stanford, and Gerald J. McDonald, Menlo Park, Calif., assignors to Stanford Research Institute, Menlo Park, Calif.
No Drawing. Filed Apr. 19, 1972, Ser. No. 245,623
Int. Cl. C07d *15/16*
U.S. Cl. 260—340.2      1 Claim

ABSTRACT OF THE DISCLOSURE

Glycolide is prepared in highly pure form from O-haloacetylglycolic acid salts by elimination of a mineral acid salt and attendant closure of the ring. In a typical preparation, the novel compound O-chloroacetylglycolic acid is converted to a salt and glycolide is then formed as the salt is heated in a vacuum sublimation apparatus wherein the glycolide condenses on a cool surface. The glycolide can be polymerized to form polyglycolic acid of high purity which is useful in the fabrication of sutures which are absorbable in body fluids.

BACKGROUND OF THE INVENTION

In accordance with the present invention, glycolide is produced directly in a relatively pure state. This is in contrast to the complex methods of the prior art, typified by U.S. Pats. Nos. 2,668,162, 3,457,280 and 3,435,008, wherein glycolic acid is first converted to a brittle, polymeric form of polyglycolic acid which is then thermally depolymerized to a crude glycolide material which must be subjected to an extensive and costly purification operation in order to obtain the essentially pure glycolide.

Summary of the invention

It has been discovered that glycolide can be produced in relatively pure form by the elimination of the elements of a mineral acid salt, with attendant ring closure, from a salt of an O-haloacetylglycolic acid by heating the salt to a temperature effective to bring about the reaction,

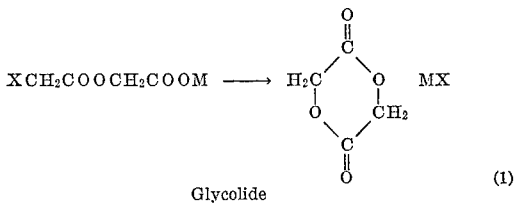

(1)

wherein X represents a halogen atom which preferably is chlorine but which also can be bromine, iodine or fluorine, and wherein M represents an alkali or alkaline earth metal or an ammonium or substituted ammonium ion. Preferably M is sodium or other metal of the alkali metal group. The novel compound O-chloroacetylglycolic acid, in the form of an appropriate salt, constitutes a preferred starting material for employment in the process of this invention to form glycolide.

The reaction presented above in Equation 1 proceeds readily as the glycolide precursor, i.e., the O-haloacetylglycolic acid salt, is heated at elevated temperatures, usually above 100° C. Inasmuch as the glycolide product is unstable in the presence of water (which tends to induce the glycolide to polymerize) care should be taken in forming glycolide to exclude moisture or to at least keep the same at low levels. In one method it has been found that this reaction goes forward when the glycolide precursor in anhydrous salt form is heated in vacuo. Here the glycolide formed with heating readily sublimes at reduced pressures, leaving behind the mineral acid salt byproduct. Good results can be obtained, for example, when heating the anhydrous starting material at temperature from about 100° to 200° C., or higher, at pressures below about 10 torr, to effect the desired sublimation.

In another method, the glycolide precursor can be dispersed in a high boiling, generally non-reactive solvent such as diglyme or xylene in which the salt is insoluble but which is capable of dissolving the glycolide as the latter is formed. The reaction goes forward as the dispersion is brought to elevated temperatures, with the formed glycolide product then being recovered by filtering the reaction mixture to remove the salt byproduct and then evaporating the solvent from the residual glycolide product.

Whatever method be employed to form the glycolide from the O-haloacetylglycolic acid salt, there is formed a relatively pure glycolide product which can readily be further purified, if desired, by subjecting the same to one or more subliming steps. Once formed, glycolide readily sublimes in vacuo at room temperatures, or below. A typical purification subliming step is one practiced at 0.03 torr and at 25° C.

The O-haloacetylglycolic acid salts employed as starting materials in the present invention can be prepared by first reacting glycolic acid with haloacetyl chloride in accordance with the following equation:

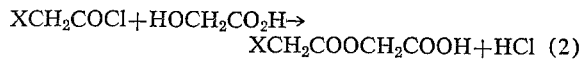
$$XCH_2COOCH_2COOH + HCl \quad (2)$$

where X has the meaning described above. This is a conventional esterification reaction which proceeds rapidly, usually at room temperatures, in the presence of a suitable solvent, e.g., tetrahydrofuran or diethyl ether, and an acid acceptor compound such as triethylamine or pyridine. Thus, the novel acid compound O-chloroacetylglycolic acid can readily be prepared in this fashion from glycolic acid and chloroacetyl chloride.

The acid compounds so prepared (Equation 2) are then converted to the desired salts by reaction with appropriate base compounds under anhydrous conditions to avoid hydrolysis of the starting material to chloroacetic and glycolic acids. Thus, while conventional bases such as sodium or potassium hydroxide, carbonate or bicarbonate can be used, the reaction is preferably conducted in an anhydrous system, using a base such as sodium hydride and an appropriate organic solvent.

Description of preferred embodiments

The following examples are illustrative of the invention but are not to be construed as limiting.

EXAMPLE 1

Preparation of O-chloroacetylglycolic acid in Method A

Glycolic acid (0.76 g., 10 mmol) and triethylamine (1.01 g., 10 mmol) were dissolved in anhydrous tetrahydrofuran (8 ml.). Chloroacetyl chloride (1.13 g., 10 mmol) in tetrahydrofuran (2 ml.) was added dropwise with stirring at 0° C. The reaction was vigorous and triethylamine hydrochloride precipitated immediately. After the mixture had been stirred for 1 hr. at 0° C. and 3 hr. at 25° C., it was quenched in water (30 ml.). Extraction with diethyl ether gave 1.1 g. of a pale yellow mobile oil. Distillation gave 0.93 g. of a colorless oil boiling at 110° C. and 0.2 torr. Analysis by NMR showed that the oil was composed of approximately 80% O-chloroacetylglycolic acid (0.74 g., 48.5% yield) and 20% chloroacetic acid.

EXAMPLE 2

Preparation of O-chloroacetylglycolic acid in Method B

Glycolic acid (67.4 g., 0.887 mol) was stirred with diethyl ether (250 ml.) for 10 min., but the solid acid did not dissolve. Pyridine (69.4 g., 0.878 mol) was added in one portion. The acid seemed to dissolve, but then an oil phase separated. Chloroacetyl chloride (99.2 g., 0.878 mol) was added dropwise with stirring over a 2-hr. period at a rate sufficient to maintain gentle reflux of the ether. Tetrahydrofuran (100 ml.) was added during the addition, but the oil phase remained as a separate lower layer. After standing for 3 days, the phases were separated. The upper phase was quenched in 100 ml. of water; extraction with ether gave 22 g. of an oil having a small amount of a second immiscible oil floating on top in the form of small droplets. The lower (oil) phase from the original reaction mixture was also quenched in water; extraction with ether gave 61 g. of a cloudy oil. Analysis of the two extracts by IR indicated they were of similar composition, so they were combined for distillation. Chloroacetic acid (ca. 10 g.) distilled first, followed by 40.2 g. (30% yield) of O-chloroacetylglycolic acid; B.P. 105° C. at 0.1 torr. The nonvolatile residue weighed 20 g. The product was cloudy due to contamination by a small amount of an immiscible oil phase; it all solidified after standing a few days. The NMR spectrum of the product in $CDCl_3$ showed three singlets at $\tau$—1.3, 5.25, and 5.84; the first was due to the carboxyl proton, and the other two peaks (equal intensity) were due to the protons of the two methylene groups. An impurity peak in the NMR spectrum was seen at $\tau$ 5.16.

*Elemental analysis.*—Calcd. for $C_4H_5ClO_4$ (percent): C, 31.50; H, 3.30; Cl, 23.24. Found (percent): C, 30.54; H, 3.32; Cl, 22.06.

EXAMPLE 3

Preparation of sodium O-chloroacetylglycolate

Sodium hydride (0.56 g., 23.3 mmol) in anhydrous tetrahydrofuran (25 ml.) was stirred mechanically as a solution of O-chloroacetylglycolic acid (3.55 g., 23.3 mmol) in tetrahydrofuran (15 ml.) was added dropwise over 1 hr. at 0° C. Gel formation occurred after about 80% of the acid had been added. Stirring was continued for an additional hour at 25° C. Diethyl ether (40 ml.) was added and the salt was filtered off and washed with several portions of diethyl ether. The product was dried in vacuo over phosphorous pentoxide and weighed 4.05 g. (99.6% yield); it melted indefinitely above 130° C. The IR spectrum of the product in nujol showed absorption bands at 5.62, 5.70 and 6.10μ.

EXAMPLE 4

Preparation of glycolide

Anhydrous sodium O-chloroacetylglycolate (0.44 g., 2.52 mmol) was heated in a vacuum sublimator with an oil bath. The first trace of product sublimed from the reactor at 125° C., and over the course of 1 hr. the temperature was further increased to 240° C. to complete the reaction. This sublimate, suitably protected from contact with moisture, was purified by fractional vacuum sublimation at 0.03 torr and 25° C. Three fractions were collected, as indicated in the following table:

SUBLIMATION OF CRUDE GLYCOLIDE

| Fraction | Weight grams | Fraction of starting material, percent | Melting point, °C. |
|---|---|---|---|
| 1 | 0.031 | 19 | 59–68 |
| 2 | 0.017 | 10 | 80–82 |
| 3 | 0.055 | 34 | 81–84 |

The literature melting point for glycolide is 85° C. An NMR spectrum of the third fraction in $CDCl_3$ showed one absorption band at $\tau$ 5.08; no impurity peaks were seen. Elemental analysis of fraction three. Calcd. for $C_4H_4O_4$ (percent): C, 41.39; H, 3.47. Found (percent): C, 41.51; H, 3.46.

The process of Example 4 can be repeated with other salts being employed in lieu of the sodium O-chloroacetylglycolate. Typical salts which may be employed as glycolide precursors in this fashion include sodium O-fluoroacetylglycolate, soduim O - bromoacetylglycolate, sodium O-iodoacetylglycolate, potassium O-chloroacetylglycolate, lithium O-chloroacetylglycolate, calcium O-chloroacetylglycolate, barium O-chloroacetylglycolate and tetramethyammonium O-chloroacetylglycolate.

We claim:

1. A method of preparing glycolide which comprises heating an anhydrous O-haloacetylglycolic acid salt having the formula $XCH_2COOCH_2COOM$, wherein X represents a halogen atom and M represents an alkali, alkaline earth metal, ammonium or substituted ammonium ion, in the substantial absence of water at temperatures above about 100° C. and pressures below about 10 torr to effect conversion of said acid salt to glycolide and the sublimation of said glycolide.

References Cited

UNITED STATES PATENTS 2,163,268  6/1939  Carothers et al. ____ 260—340.2

FOREIGN PATENTS 519,731  12/1955  Canada _____ 260—340.2

OTHER REFERENCES

Chemical Abstracts, vol. 8 (1914), pp. 3776–7.

Hickenbottom, W. J., Reactions of Organic Compounds, 2d ed. 1948, pp. 414–6.

NORMA S. MILESTONE, Primary Examiner

U.S. Cl. X.R.

260—487